Figure 1:
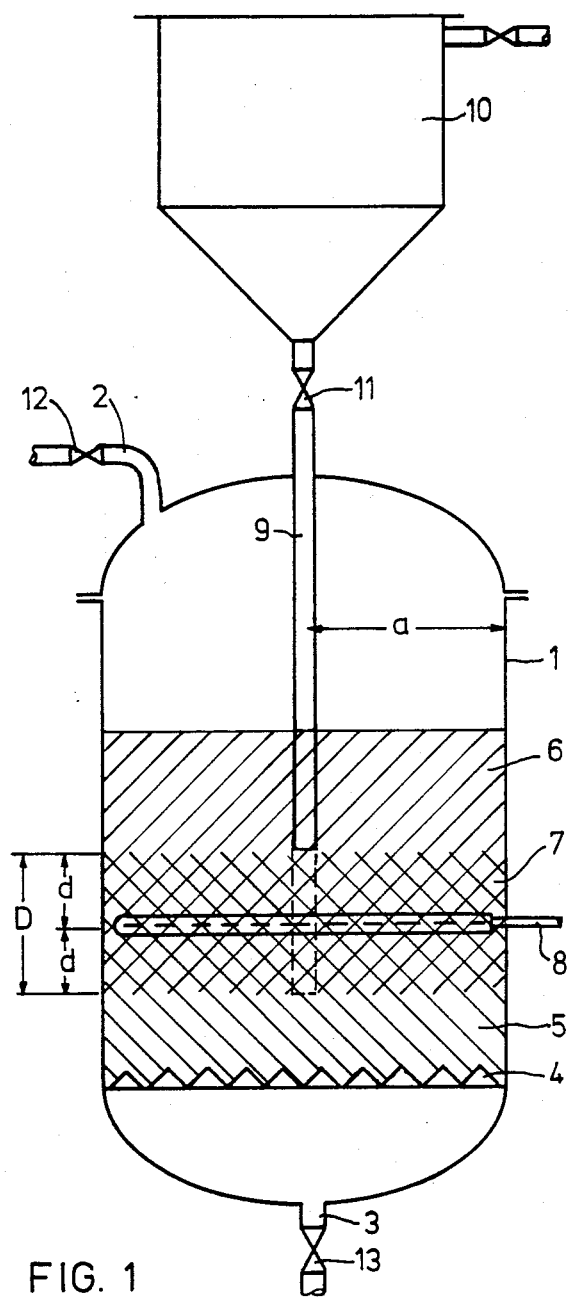

United States Patent [19]

Martinola

[11] Patent Number: 4,519,916
[45] Date of Patent: May 28, 1985

[54] PROCESS FOR INTERNAL REGENERATION OF ION EXCHANGER RESINS IN MIXED BED FILTERS, AND MIXED BED FILTERS FOR CARRYING OUT THE PROCESS

[75] Inventor: Friedrich Martinola, Cologne, Fed. Rep. of Germany

[73] Assignee: Bayer Aktiengesellschaft, Leverkusen, Fed. Rep. of Germany

[21] Appl. No.: 592,164

[22] Filed: Mar. 22, 1984

[30] Foreign Application Priority Data

Apr. 14, 1983 [DE] Fed. Rep. of Germany ....... 3313471

[51] Int. Cl.³ .............................................. B01J 49/00
[52] U.S. Cl. .................................... 210/678; 210/686; 210/189; 210/279; 521/26
[58] Field of Search ............... 210/675, 678, 686, 189, 210/269, 279, 290; 521/26

[56] References Cited

U.S. PATENT DOCUMENTS 3,130,151  4/1964  Levendusky .......................... 210/675
3,915,861  10/1975  Marquardt ........................... 210/189
4,191,644  3/1980  Lembo et al. .......................... 521/26
4,298,696  11/1981  Emmett ................................ 210/675

Primary Examiner—Ivars Cintins
Attorney, Agent, or Firm—Sprung, Horn, Kramer & Woods

[57] ABSTRACT

The invention relates to a process for internal regeneration of mixed bed filters in which, after the exhausted ion exchanger mass has been separated into the two components and these have been regenerated and washed out, the exchanger layer in the region of the cation exchanger/anion exchanger interface is selectively removed from the mixed bed filter, the cation exchanger remaining in the filter is mixed with the anion exchanger remaining in the filter for the new loading stage, the ion exchanger mass removed from the filter is added again, when the work cycle has ended, to the exhausted ion exchanger mass before or during the separation into cation exchanger and anion exchanger, and, after the separation, the loading stage is started again with the regeneration of the cation exchanger and anion exchanger; and also to a mixed bed filter for carrying out the process.

8 Claims, 3 Drawing Figures

PROCESS FOR INTERNAL REGENERATION OF ION EXCHANGER RESINS IN MIXED BED FILTERS, AND MIXED BED FILTERS FOR CARRYING OUT THE PROCESS

The invention relates to a new process for internal regeneration of exhausted cation and anion exchanger resins in mixed bed filters, and a mixed bed filter for carrying out the process.

Mixed bed filters are ion exchanger filters filled with cation exchangers and anion exchangers. During the loading operation, the cation exchangers and anion exchangers are in the form of an intimate mixture. For regeneration of the loaded exchanger, the mixed bed is separated hydraulically into the cation exchanger and anion exchanger on the basis of the different specific gravities of these two components, and in particular into a lower layer of the cation exchangers of higher specific gravity and a lower layer of the anion exchangers of lower specific gravity. After the separation, the cation exchanger and anion exchanger are regenerated separately and washed out.

Mixed bed filters are known and, since effective demineralisation can be achieved with them, are also frequently used in practice. However, mixed bed filters have the serious disadvantage that regeneration of the exhausted ion exchangers presents considerable difficulties because only incomplete sorting of the mixed bed into cation exchanger and anion exchanger is possible. The imcomplete separation into cation exchanger and anion exchanger has the result that, when the cation exchanger is regenerated, the anion exchanger particles contained therein become loaded with the regenerating agent intended for the cation exchanger, and when the anion exchanger is regenerated, the cation exchanger particles contained therein become loaded with the regenerating agent intended for the anion exchanger.

In the case of mixed bed filters with internal regeneration, the mis-loading of cation and anion exchangers caused by the incomplete separation is accompanied by unavoidable mis-loading of the ion exchanger components close to the cation exchanger/anion exchanger interface as a result of penetration of the regenerating agent of the one component into the layer of the other component.

In the loading stage, the mis-loading leads to a reduction of the quality of the liquid treated; in addition, mis-loading is one reason why only disproportionately low operating capacities are achieved with mixed beds.

To avoid mis-loading by penetration of the regenerating agent for the one component into the layer of the other component and the reduction in the quality of the treated liquids and reduction in the operating capacity thereby caused, it has been proposed to carry out the regeneration not internally, that is to say in the mixed bed filter itself, but externally, that is to say in separate vessels outside the mixed bed filter. In this external regeneration, the exchanger mass is conveyed hydraulically from the mixed bed filter into a separating column. The two components are separated in this column by backwashing. After the one of the components has been transferred to a third vessel, each of the two components is regenerated and washed out by itself. The two components are then conveyed back into the mixed bed filter and mixed there for the next loading stage.

Although penetration of the regenerating agent for the one component into the layer of the other component and the mis-loading caused by this penetration are avoided by external regeneration, mis-loading of the ion exchangers as a result of incomplete separation into cation exchanger and anion exchanger and the consequences of this mis-loading (low operating capacity and unsatisfactory quality of the liquid treated) are not avoided. Contamination of the particular ion exchanger component by particles of the opposite component is, of course, highest close to the cation exchanger/anion exchanger interface. It has therefore been proposed (see, for example, German Auslegeschrift No. 2,631,414; British Patent Specification No. 1,498,139), in order to reduce the mis-loading, and consequences thereof, caused by incomplete separation, also to separate off, after the one component, for example the cation exchanger, has been discharged, the mixed resin zone remaining between the two components after external separation of the mixed bed into cation exchanger and anion exchanger, and not to utilise this zone in the regeneration process, but to store it in a separate container and to add it again only to the spent mixed bed of the next work cycle before the separation into cation, exchanger and anion exchanger.

Mis-loading is largely avoided with the aid of this special process for external regeneration of ion exchangers in mixed bed filters, and as a result substantial improvement in the operating capacity and the quality of the treated liquid is achieved, in comparison with the operating capacity and quality of the treated liquid which are obtained with mixed bed filters with internal regeneration. Nevertheless, these special processes, for example the process described in German Auslegeschrift 2,631,414, have found only very restricted application, because, in fact, the processes and the devices necessary to carry them out are much too expensive.

Addition to the ion exchanger mass of a resin which does not participate in the ion exchange and which interposes itself between the anion exchanger and the cation exchanger on sorting has been proposed as another measure for improving the operating capacity of mixed bed filters with internal regeneration and the quality of the liquids treated with them (see, for example, German Patent Specification No. 971,771; and U.S. Pat. No. 2,666,741). Immediate contact between the cation exchanger and anion exchanger is intended to be avoided by these separating layer resins. If the outlet for the regenerating agent streams is placed in this intermediate layer of inert resin, the danger of penetration of the individual regenerating agent solutions into the opposite component is certainly reduced. However, the incomplete sorting and the mis-loading caused thereby cannot be improved by the use of the separating layer resins. Rather, the introduction of a third inert component also has the disadvantage that the ion exchanger mass is diluted by the volume content of the third component (about 20%), and the operating volume capacity of the mixed bed filter is thus further reduced. In addition, the separation boundaries for cation exchanger/separating resin and anion exchanger/separating resin are less sharply defined than the boundary between the two ion exchangers in the two-component system, because the difference in specific gravity between the inert resin and the particular ion exchanger is only half the difference between the two ion exchangers. A change in specific gravity even of only one of the three components, as frequently occurs in operation in practice, or a change in the particle size, for example by abrasion, therefore leads directly to insufficient separation of ion exchanger and inert resin. This means, however, that the volume of the one exchanger component is increased by the volume of the inert resin, and that the separation boundary with respect to the other exchanger component is in this way displaced to above or below the central drainage originally located in the middle of the layer of the separating resin. This, however, is an even more adverse situation than already exists in the simple mixed bed filters. The property of the separating resins of tending to float when air is blown into the mixed bed also leads to further complications. The intended effect of the separating resins as an intermediate layer is lost by this floating.

This means that even with the aid of separating layer resins, the technical problem of eliminating or at least reducing the difficulties which occur during regeneration in mixed bed filters with internal regeneration and thereby of achieving a higher operating capacity and an improved quality of the liquid treated, cannot be solved.

It has now been found that the technical problem described above can be solved in a surprisingly simple manner if, in mixed bed filters with internal regeneration, after separation of the exhausted resin mass into cation exchanger and anion exchanger and regeneration and washing out of the two components, the exchanger layer in the region of the cation exchanger/anion exchanger interface is removed from the filter in particular selectively and without the adjacent ion exchanger layers being whirled, only then the cation exchanger remaining in the filter is mixed with the anion exchanger remaining in the filter for the loading stage, the loading stage is carried out, the ion exchanger mass removed from the filter is added to the exhausted ion exchanger mass before or during the separation into the components and, when the separation has ended, the work cycle is started again with regeneration of the cation exchanger and anion exchanger.

In mixed bed filters with internal regeneration, the central drainage is necessarily in or in the immediate vicinity of the cation exchanger/anion exchanger interface, since any displacement from the interface into one of the components leads to increased mis-loading of these components by the regenerating agent for the opposite component. Therefore for mixed bed filters with internal regeneration, the phrase "in the region of the cation exchanger/anion exchanger interface" means the same as the phrase "in the region of the central drainage".

The ion exchanger layer removed from the filter consists of a mixture of cation exchanger and anion exchanger which essentially contains all of the mis-loaded cation exchanger and anion exchanger.

By the removal, according to the invention, of this ion exchanger layer in the region of the cation exchanger/anion exchanger interface (=in the region of the central drainage), no mis-loading, but only completely regenerated cation exchanger and anion exchanger participate in the loading stage. The operating capacity of the mixed bed filter is thus decisively increased and the quality of the treated liquid is substantially improved.

The invention thus relates to a process for internal regeneration of mixed bed filters in which the separation of the exhausted ion exchanger mass of the mixed bed into cation exchanger and anion exchanger is carried out by means of upward-flowing liquid and the cation exchanger and anion exchanger are regenerated and washed out, which is characterised in that, after separation of the exhausted ion exchanger mass and regeneration and washing out of the two components, the ion exchanger layer in the region of the cation exchanger/anion exchanger interface is selectively removed from the mixed bed filter without the adjacent ion exchanger layers being whirled, the cation exchanger remaining in the filter is mixed with the anion exchanger remaining in the filter for the new loading stage, the ion exchanger mass removed from the filter is again added, when the loading stage has ended, to the exhausted ion exchanger mass before or during separation into cation exchanger and anion exchanger and, when the separation has ended, the work cycle is started again with regeneration of the cation exchanger and anion exchanger.

The ion exchanger layer to be removed, according to the invention, from the mixed bed filter is transferred to a separate storage vessel. From there, it is added again to the ion exchanger remaining in the mixed bed filter before or during the separation, if necessary after rinsing to remove fine portions and/or after addition of new ion exchanger as a replacement for fines and/or other similar special treatments. It is essential that the ion exchanger mass to be removed, according to the invention, from the mixed bed filter participates, together with the mixed bed mass remaining in the filter, in the separation operation and in the regeneration operation which follows the separation into cation exchanger and anion exchanger, before it is removed again, as described, before mixing of the cation exchanger and anion exchanger for the loading stage.

The thickness of the resin layer to be removed according to the invention, from the region of the cation exchanger/anion exchanger interface (=the region of the central drainage), depends on the sharpness of the cation exchanger anion exchanger separation boundary; the sharper the separation boundary, the lower can be the thickness of the layer of resin to be removed. Conversely, the more indistinct the separation boundary, the greater must be the thickness of the resin layer to be removed.

Apart from depending on the difference between the specific gravities of the cation exchanger and the anion exchanger, the sharpness of the separation boundary particularly depends on the uniformity of the distribution of liquid during the hydraulic separation, the regeneration and the washing out. Since, according to the invention, even thick layers of resin can be removed without problems from the region around the central drainage, the process according to the invention does not depend on whether sharp or not so sharp separation of the cation exchanger from the anion exchanger is achieved and hence also does not depend on the distribution of the liquid in the filter or on mistakes by the operating personnel. The process according to the invention gives constantly good, reproducible results, independently of the sharpness of the cation exchanger/anion exchanger separation boundary, if the thickness (D) of the resin layer to be removed from the mixed bed filter is appropriately chosen in size. The most advantageous thickness for a specific case is determined empirically.

In general, it has proved appropriate for the thickness (D) (see FIG. 1), in the filter, of the resin layer to be removed to be 100 to 500 mm, that is to say in each case 50 to 250 mm above and below the central drainage, preferably 200 to 400 mm, that is to say in each case 100 to 200 mm above and below the central drainage.

Removal of the ion exchanger layer in the region of the cation exchanger/anion exchanger interface can be effected in a particularly simple manner by hydraulic conveying. Surprisingly, it has been found that, in the hydraulic conveying proposed according to the invention, no whirling of the ion exchanger layers adjacent to the resin layer to be removed occurs.

The uniform non-whirling conveying, required for the process according to the invention, of the particular resin layer from the region of the central drainage can be achieved, for example, hydraulically by inserting vertically into the layered ion exchanger mass of the mixed bed filter as many ascending tubes (9) as are required such that the distance between the ascending tube and the filter wall or, in the case of several ascending tubes, between the ascending tubes and the filter wall and adjacent ascending tubes is about the same and does not exceed certain values, and the ascending tube(s) (9) is/are inserted into the ion exchanger mass to a depth such that the end(s) of the ascending tube(s) in the ion exchanger mass is/are in the lower boundary surface, if hydraulic pressure is conveyed from the top, or in the upper boundary surface, if hydraulic pressure is conveyed from the bottom, of the ion exchanger layer (7) to be removed from the filter. In order to achieve technically reasonable flow rates of about 0.1 to 3 m/second, preferably 0.4 to 2 m/second, in the ascending tube (9) or the ascending tubes (9), the ratio of free filter cross-section to free cross-section of the ascending tube or, in the case of several ascending tubes, to the sum of the free cross-sections of the individual ascending tubes, should be about 300:1 to 500:1.

Hydraulic conveying of ion exchangers from ion exchanger filters, for example mixed bed filters, is known per se. However, in this known hydraulic conveying, the ascending tubes or ascending tube are/is inserted down to the bottom of the filter and the ion exchanger mass is forced out of the filter in its entirety, without paying attention to whirling. The hydraulic conveying according to the invention differs from this known hydraulic conveying in that a specific intermediate layer is thereby removed selectively from the ion exchanger mass without whirling of the ion exchanger mass adjacent to this intermediate layer.

The invention thus also relates to a mixed bed filter with internal regeneration for carrying out the claimed process. This mixed bed filter according to the invention is characterized in that it consists of a filter apparatus which is customary for mixed bed filters with internal regeneration, e.g. a container equipped with dosable liquid feed and outflow lines, the cylindrical section of this container being closed at the bottom by a device which is permeable to liquid, on which the ion exchanger mass consisting of cation exchanger and anion exchanger rests and in which there is a central drainage at the level of the theoretical cation exchanger/anion exchanger interface, which filter apparatus is equipped by a device providing for the selective removal from the filter of the ion exchanger layer in the region of the cation exchanger/anion exchanger interface without the adjacent ion exchanger layers being whirled.

An especially simple and effective device for the selective removal of the ion exchanger layer in the region of the cation exchanger/anion exchanger interface from the filter is provided by one or more ascending tube(s) inserted vertically into the ion exchanger mass and connected to a storage vessel, the opening(s) of this (these) tube(s) dipping into the ion exchanger mass being in the lower or upper interface of the resin layer to be conveyed out of the filter, depending on whether the liquid for the hydraulic conveying is passed into the filter from the top or from the bottom, this (these) ascending tube(s) being arranged uniformly in the cross-section of the filter such that the distance(s) (a) between the ascending tube(s) (centre of the tube) and the filter wall do(es) not exceed a certain value, the value of 400 mm, and-in the case of several ascending tubes-the distances of the individual ascending tubes from one another, which are optionally different, do also not exceed a certain value, the value of 800 mm.

The distance(s) between the ascending tube (centre of the tube) and the filter wall is (are) preferably 150 to 300 mm; the distances between ascending tube (centre of the tube) and ascending tube (centre of the tube), which are optionally different, are preferably 300 to 600 mm.

The internal diameter of the ascending tubes is advantageously 10 to 50 mm, preferably 10 to 25 mm.

It has proved appropriate to match the distance (a) between the ascending tube (centre of the tube)/container wall and the thickness (D) of the resin layer to be removed, according to the invention, from the region of the central drainage with one another, and in particular such that the ratio a:D is at most 4:1, preferably 2:1 to 1:1.

Figure 2:
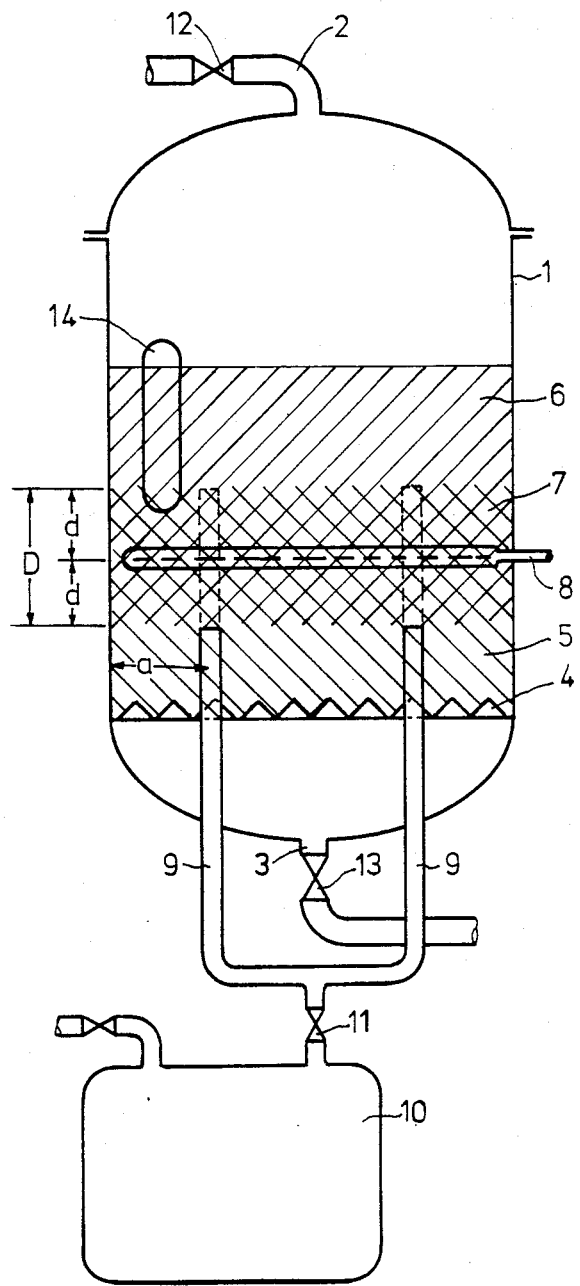
Figure 3:
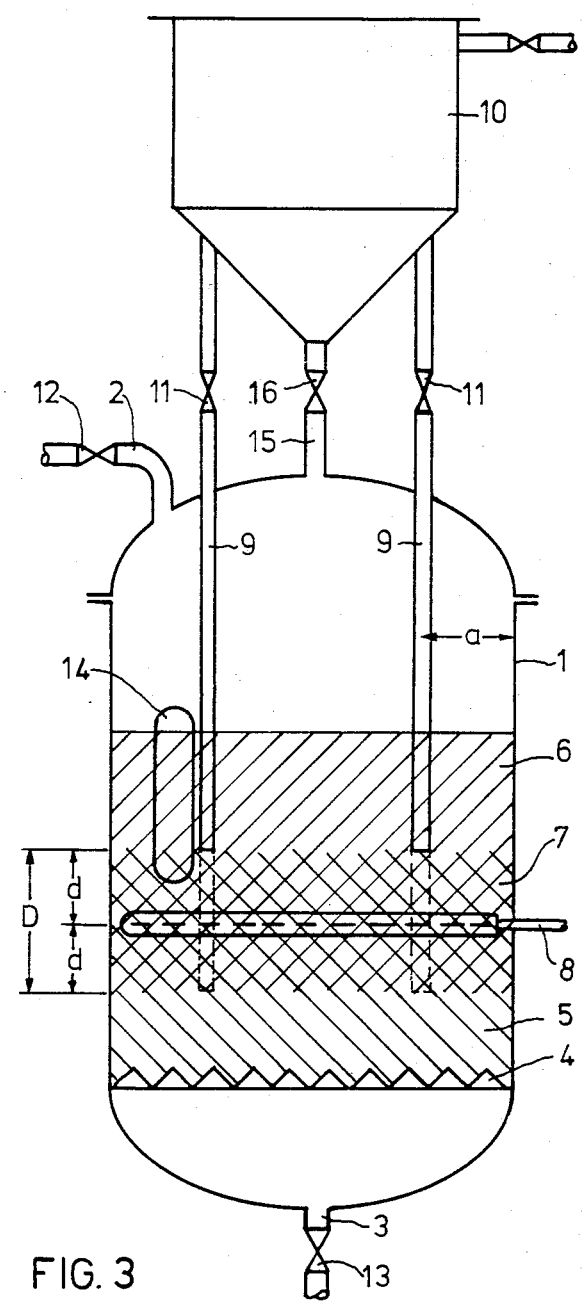

The resin layer to be removed from the region of the central drainage is preferably conveyed through ascending tubes inserted vertically into the resin mass from the top (see FIGS. 1 and 3). A preferred embodiment of the mixed bed filter according to the invention is shown schematically in FIGS. 1, 2 and 3. In this embodiment the mixed bed filter according to the invention consists of a container (1) equipped with closable liquid feed and outflow lines (2) and (3), the cylindrical section of this container being closed at the bottom by a device (4) which is permeable to liquid, for example a nozzle tray, on which the ion exchanger mass consisting of cation exchanger (5) and anion exchanger (6) rests; in which there is a central drainage (8) at the level of the theoretical cation exchanger/anion exchanger interface (=level of the cation exchanger filling), and which is provided with one or more ascending tube(s) (9) inserted vertically into the ion exchanger mass and connected to a storage vessel (10) the opening(s) of this these tube(s) (9) dipping into the ion exchanger mass being in the lower or upper interface of the resin layer (7) to be conveyed out of the container (1), depending on whether the liquid for the hydraulic conveying is passed in from the top, that is to say through line (2), or from the bottom, that is to say through line (3), and in which the ascending tube(s) (9) is/are arranged uniformly in the cross-section of the container (1) such that the distance/distances (a) between the ascending tube (centre of the tube) and the container wall do(es) not exceed the value of 400 mm and-in the case of several ascending tubes (9)-the distances of the individual ascending tubes (9) from one another, which are optionally different, do not exceed the value of 800 mm.

the process according to the invention and the operation of the mixed bed filter according to the invention may be illustrated with the aid of the mixed bed filter according to the invention, shown schematically in FIG. 1:

Step A (filling of the filter and regeneration of the ion exchanger):

The space between the lower nozzle tray (4) and the central drainage (8) in the container (1) is filled with cation exchanger (5). A layer of anion exchanger (6) is introduced on the cation exchanger (5). Each of the two components is then regenerated separately. For this, the regenerating agents for the two components can be passed through the components in different directions: in cocurrent from the top downwards; in this case, the regenerating agent for the anion exchanger, that is to say the regenerating base, is fed in through line (2) and taken off through the central drainage (8), and the regenerating agent for the cation exchanger (5), that is to say the regenerating acid, is fed through the central drainage (8) and taken off through line (3); or in countercurrent; in this case, the regenerating base is fed in through line (2) and the regenerating acid is fed in through line (3) and the regenerating agents flowing out are taken off together at the central drainage (8). After regeneration, washing out of the ion exchangers is carried out in the same manner as the regeneration.

Step B (removal, according to the invention, of the resin layer (7) in the region of the central drainage (8)):

(a) In the case of hydraulic conveying of the resin layer (7) by pressure from the top onto the ion exchanger mass; feeding in of the liquid effecting conveying, through line (2); in this method of conveying, the end of the ascending tube (9) dipping into the ion exchanger mass is in the lower boundary surface of the resin layer (7) to be removed from the filter. When washing out of the two components (5) and (6) has ended, liquid is forced into the container (1) through line (2), with valve (13) closed and valve (11) open. The anion exchanger layer (6) falls to the same extent as the resin layer (7) is conveyed through the ascending tube (9) into the storage vessel (10). As soon as the resin layer (7) has disappeared, the feed of liquid through (2) is ended by closing valve (12). At the same time, valve (11) is also closed.

(b) Innstead of being conveyed by pressure from the top, the resin layer (7) can also be conveyed to the storage vessel (10) by pressure from the bottom via ascending tube (9). In this conveying method, the end of the ascending tubes (9) dipping into the ion exchanger mass is in the upper boundary surface of the resin layer (7) to be removed from the filter. In this case, liquid is forced through line (3) into the container (1), with valve (12) closed and valve (11) open, until the layer of resin (7) is in the storage vessel (10).

Conveying according to (a) is preferred, that is to say by pressure of liquid from the top.

When the resin layer (7) has been removed from the container (1) and the ion exchangers remaining in the container (1) have been mixed by blowing in air, the regeneration stage has ended and the loading stage (step C) starts.

Step C (loading stage):

The liquid to be treated enters the container (1) through line (2), flows through the mixed bed built up in step B from the top downwards and leaves the container (1) as worked-up liquid via line (3).

Step D (recycling of the resin layer (7) removed from the region of the central drainage (8) in step (B)):

When the loading stage (step C) has ended, valve (11) is opened and the resin in the storage vessel (10) is recycled into the container (1) through the ascending tube (9) and is there subjected to separation and regeneration (step E) together with the exhausted ion exchanger mass of the mixed bed.

Recycling of the resin mass in the storage vessel (10) can also be effected during the separation (sorting) of the exhausted ion exchanger mass of the mixed bed.

Step E (separation and regeneration of the resin mass exhausted in the loading stage (step C) and of the resin mass recycled from the storage vessel (10)):

The exhausted resin mass of the mixed bed and the resin mass recycled from the storage vessel (10) are separated by backwashing in an upwards-directed stream of liquid, that is to say by passing in liquid through line (3), into the cation exchanger (5) and an ion exchanger (6). Each of the two components, which are again in separate layers, is then regenerated separately as described in step (A). The regeneration is again ended with step B (transfer of the resin layer (7) into the storage vessel (10).

The resin layer (7) to be removed, according to the invention, from the filter should essentially contain all the mis-loaded cation exchanger and anion exchanger. The thickness (D), required to achieve this aim, of the resin layer (7) symmetrically surrounding the central drainage (8) is determined empirically. The distance (d) which the bottom end of the ascending tubes (9) must be from the central drainage (8) is given by the required thickness (D). This distance (d) is D/2. Depending on whether conveying is effected with pressure from the top or from the bottom, the end of the ascending tubes (9) dipping into the ion exchanger mass is at a distance (d) of D/2 either below or above the central drainage (8). The desired thickness (D) of the resin layer (7) to be removed from the region of the central drainage (8) can be adjusted particularly easily if the ascending tubes (9) are adjustable in length.

The storage vessel (10) is advantageously closed at the top by a device which is permeable to liquid but impermeable to ion exchanger. This device enables liquid to be drawn off continuously from the storage vessel, without ion exchanger also being discharged.

The disappearance of the resin layer (7) during transfer into the stock vessel (10) can be monitored, for example, by the falling of the upper edge of the anion exchanger (6) in the viewing glass (14) (see FIG. 2) or by the volume of resin conveyed into the storage vessel (10). Monitoring of the volume of resin conveyed into the storage vessel (10) can be effected particularly easily if the storage vessel (10) is designed as a measurement vessel. The amount, that is to say also the thickness (D) of the resin layer (7) conveyed, is given directly by the volume of resin conveyed.

The resin layer (7) conveyed into the storage vessel (10) can be recycled through ascending line (9). However, recycling can also be effected by a separate recycling line (15) (see FIG. 3).

A further advantageous embodiment of the mixed bed filter according to the invention can consist in a funnel-like widening of the bottom end of the ascending tubes (9) intended for removal, according to the invention, of the resin layer (7). The resin layer (7) can be drawn off particularly uniformly with the aid of this/these ascending tube(s) (9) widened in a funnel-like manner. The cross-section of the funnel-like widening of the ascending tube is advantageously 2 to 10 times, preferably 4 to 6 times, one cross-section of the ascending tube.

Apart from the advantages of higher operating capacity and improved quality of the treated liquid which have already been mentioned, the process according to the invention offers the following advantages:

In the procedure of the process according to the invention, the full volume capacity of the mixed bed fillings is retained and the difference in acidic gravity of the cation exchanger and anion exchanger is fully utilised. Furthermore, a substantially improved utilisation of the regenerating agents and hence a substantial reduction in the consumption of regenerating agents is achieved with the aid of the process according to the invention. This improved utilisation is caused on the one hand by the fact that, in the process according to the invention, the layer heights of the two components are always great enough for efficient regeneration. The improved utilisation of regenerating agent is caused on the other hand by the fact that the ion exchanger mass removed from the filter is essentially in regenerated form. Since the cation exchanger has a lower specific gravity in the H form than in the form loaded with metal cations, this regenerated cation exchanger forms, after the separation, the top zone of the cation exchanger layer, through which the regenerating agent flows through last, whilst the exhausted cation exchanger forms the bottom zone of the cation exchanger layer, through which the regenerating agent flows through first. This zoning of the cation exchanger during regeneration leads to a particularly complete regeneration of the loaded cation exchanger and to a particularly good utilisation of the regenerating agent.

In the process according to the invention, the cation exchanger and the regenerating agent for the anion exchanger can be passed through the layer of ion exchanger in question either in the same direction, e.g. both from the top downwards or both from the bottom upwards, or in opposite directions to each other. In the process according to the invention, it is particularly advantageous to pass the two regenerating agents in opposite directions to each other. In this procedure, the regenerating agent for the anion exchanger is fed in from the top, and taken off at the central drainage together with the cation exchanger regenerating agent, which is fed in from the bottom. Since the regenerating chemicals become spent on flowing through the two exchanger layers, their regenerating action is lowest after flowing through the exchanger layers, that is to say in the region of the central drainage. Since, according to the invention, precisely this ion exchanger mass in the region of the central drainage is removed, participation of insufficiently regenerated exchanger in the loading stage is prevented. This leads to an increase in the total capacity of the mixed bed filter and to a reduction in the slipping of ions during demineralisation, that is to say to an increase in the quality of the liquid treated.

This advantageous embodiment of the process according to the invention is of particular importance for reducing displacement slips if the mixed bed is operated not only in the H/OH form but, as is usual for the purification of ammoniacal condensates, also in the $NH_4/OH$ form. The ammonia contained in the condensate has the effect of displacing the cations and anions, especially the $Na^+$, $Cl^-$ and $SO_4^{--}$ ions, which may still remain in the mixed bed after regeneration.

The smaller the number of these ions which remain on the two components after regeneration, the smaller also the displacement slip.

A further advantage of the process according to the invention is that not only is the consumption of regenerating agent reduced, but also the amount of water required for washing out the excess regenerating agent is reduced, since washing out of the ion exchanger mass in the region of the central drainage can be shortened; during hydraulic removal, this ion exchanger mass is in any case rinsed and moreover does not participate in the loading stage.

EXAMPLE 1

A mixed bed filter constructed according to FIG. 1 is used. The container (1) has a diameter of 800 mm, its free internal cross-section is 0.5 $m^2$, and its cylindrical height, measured from the bottom nozzle tray (4), is 4,000 mm. The central drainage (8) is located at a distance of 1,000 mm from the bottom nozzle tray (4). Container (1) is equipped with 5 ascending tubes (9) (internal diameter: 15 mm) which are uniformly divided over the container cross-section, dipped into the ion exchanger mass from the top and are adjustable in the depth to which they dip in.

The filter column (1) is filled with 500 liters of strongly acid cation exchanger in the Na form (specific gravity: 1.24) and 500 liters of strongly basic anion exchanger in the Cl form (specific gravity: 1.08).

Demineralised water containing 1 ppm of Na ions, 1.5 ppm of Cl ions and 0.04 ppm of $SiO_2$ and having a conductivity of 5 $\mu S/cm$ is used for loading the regenerated mixed bed.

For the regeneration, 120 g of HCl (100% strength) in the form of 6% strength aqueous HCl/liter of cation exchanger and 120 g of NaOH (100% strength) in the form of 4% strength aqueous NaOH/liter of anion exchanger are passed through the ion exchanger in question, in each case from the top downwards. The sodium hydroxide solution which drains out of the anion exchanger is taken off at drainage (8) and the aqueous hydrochloric acid which drains out of the cation exchanger is taken off at valve (13).

After the regeneration, each ion exchanger is washed out until the conductivity of the wash water flowing out is only 10 $\mu S/cm$. (Total amount of wash water required: 8,500 liters).

From the region of the central drainage (8), a layer of resin of defined thickness D given in Table 1 ($\frac{1}{2}$ D above and $\frac{1}{2}$ D below the cental drainage) is conveyed hydraulically through tube (9) into the stock vessel (10), which is designed as a measuring vessel. The conveying rate in the ascending tubes (9) is 1 m/second.

The cation exchanger and anion exchanger remaining in the filter are mixed by bubbling in compressed air in a known manner. The mixed bed is loaded with the demineralised water described above, at a rate of 40 $m^3$/hour (flow direction: from the top downwards). After an operating time of half an hour, the residual amounts of sodium and chloride ions remaining in the water draining out of the mixed bed and the conductivity of the water are determined. The residual values (in ppb) and conductivities (in $\mu S/cm$) found are likewise shown in Table 1. To determine the capacity of the mixed bed, the total amount of water which can be passed through the mixed bed before the conductivity in the water draining out has risen to 0.5 $\mu S/cm$ is measured. These amounts of water (in bed volumes of mixed bed) are also shown in Table 1.

TABLE 1

| D* [mm] | Residual values | | Conductivity [$\mu$ S/cm] | Total throughput [BV-MB]** |
|---|---|---|---|---|
| | Na [ppb] | Cl [ppb] | | |
| 0 | 5 | 6 | 0.15 | 4,100 |

TABLE 1-continued

| D* [mm] | Residual values Na [ppb] | Cl [ppb] | Conductivity [μ S/cm] | Total throughput [BV-MB]** |
|---|---|---|---|---|
| 100 | 4 | 7 | 0.10 | 4,400 |
| 200 | 0.8 | 1 | 0.06 | 4,900 |
| 300 | 0.5 | 0.6 | 0.054 | 5,100 |
| 400 | 0.5 | 0.5 | 0.056 | 5,150 |

*D = thickness of the layer of resin removed from the region of the central drainage
**BV-MB = bed volumes of mixed bed When the mixed bed is exhausted, the ion exchanger mass stored in the storage vessel (10) is recycled into the container (1) via line (9). The combined ion exchanger mass is separated into the cation exchanger and anion exchanger by a stream of liqid entering through line (3), and is regenerated again with the stated amounts of hydrochloric acid and sodium hydroxide solution.

EXAMPLE 2

The procedure described in Example 1 is followed; however, in deviation from Example 1, the ion exchangers are regenerated with only 60 g of HCl (100% strength)/liter of cation exchanger and 60 g of NaOH (100% strength)/liter of anion exchanger.

The results obtained after regeneration with the smaller amount of regenerating agent are summarised in Table 2.

TABLE 2

| T [mm] | Residual values Na [ppb] | Cl [ppb] | Conductivity [μ S/cm] | Total throughput [BV-MB] |
|---|---|---|---|---|
| 0 | 22 | 25 | 0.27 | 2,900 |
| 100 | 20 | 25 | 0.18 | 3,050 |
| 200 | 1.5 | 2 | 0.09 | 3,280 |
| 300 | 0.5 | 0.7 | 0.06 | 4,220 |
| 400 | 0.5 | 0.7 | 0.058 | 4,700 |

EXAMPLE 3

The procedure followed is as described in Example 2, with the only difference that the acid solution is passed through the cation exchanger from the top and the sodium hydroxide solution is passed through the anion exchanger from the bottom, and the two regenerating agents draining out are removed together through the central drainage (8). Washing out of the regenerating agents is carried out in the same direction as the regeneration, in particular in Experiment (a) until the conductivity value in the liquid draining from the central drainage (8) is 30 μS/cm (amount of wash water required: 8,000 liters) in Experiment (b) until the conductivity value in the liquid draining from the central drainage (8) is 150 μS/cm (amount of wash water required 3,000 liters). The results obtained after regenerating in the manner described are summarised in Tables 3a and 3b.

TABLE 3a

| D [mm] | Residual values Na [ppb] | Cl [ppb] | Conductivity [μ S/cm] | Total throughput [BV-MB] |
|---|---|---|---|---|
| 0 | 15 | 19 | 0,20 | 3500 |
| 100 | 11 | 15 | 0,15 | 3750 |
| 200 | 1,2 | 1,5 | 0,07 | 4020 |
| 300 | 0,4 | 0,7 | 0,058 | 4300 |
| 400 | 0,4 | 0,6 | 0,056 | 4900 |

TABLE 3b

| D [mm] | Residual values Na [ppb] | Cl [ppb] | Conductivity [μ S/cm] | Total throughput [BV-MB] |
|---|---|---|---|---|
| 0 | 25 | 35 | 0.29 | 2,200 |
| 100 | 22 | 32 | 0.26 | 2,500 |
| 200 | 10 | 15 | 0.20 | 2,900 |
| 300 | 1.5 | 2 | 0.08 | 4,000 |
| 400 | 0.8 | 1 | 0.06 | 4,500 |

EXAMPLE 4

The procedure followed is as described in Example 1; however, instead of the demineralised water used in Example 1, a completely demineralised water containing 0.8 mg of NH$_3$/liter and 0.015 mg of Na ions/liter and having a pH value of 9.3 is used.

In this demineralisation experiment, the sodium concentration in the water draining out of the mixed bed filter is determined. The release of sodium ions from the mixed bed filter is a result of converting the cation exchanger into the ammonium form by the loading water. The sodium slip which occurs, that is to say the amount of sodium displaced by the ammonia, is a measure of the degree of mis-loading and regeneration of the cation exchanger.

The sodium concentrations found in the runnings (in ppb) are shown in Table 4.

TABLE 4

| D [mm] | Residual value at the time of the NH$_3$ breakthrough Na [ppb] |
|---|---|
| 0 | 35 |
| 100 | 25 |
| 200 | 10 |
| 300 | 3 |
| 400 | 1 |

The data in Table 4 show that if the thickness D of the ion exchanger layer (7) removed from the region of the central drainage is sufficient, virtually no ion slip now occurs.

EXAMPLE 5

The procedure followed is as described in Example 1, except that the resin layer (7) of defined thickness D is discharged from the region of the central drainage (8) into the storage vessel (10) not by pressure on the ion exchanger mass from the top but by pressure from the bottom. In this case, the water used for the conveying enters through tube (3). The ends of the ascending tubes (9) are at the top boundary surface of the resin layer (7) to be removed from the filter. The conveying rate in the ascending tubes (9) is 2.5 m/second.

The change in direction of the conveying water feed leads to no change in the properties of the mixed bed during the loading stage. Rather, the same residual values, conductivity values and total throughputs as shown in Table 1 in Example 1 are achieved for the individual layer thicknesses D.

EXAMPLE 6

The procedure followed is as described in Example 1, with the only difference that the ascending tubes (9) are inserted into the ion exchanger mass not from the top but, as shown in FIG. 2, from the bottom and the resin layer (7) of defined thickness D to be removed from the region of the central drainage (8) os conveyed into a storage vessel (10) below the container (1), and in particular in experimental series (a) by hydraulic pressure from the top and in experimental series (b) by hydraulic pressure from the bottom. In experimental series (a), the ends of the ascending tubes (9) dipping into the ion exchanger mass were in the bottom boundary surface of the resin layer (7) to be conveyed out of the container (1); the flow rate in the ascending tubes (9) was 1 m/second. In experimental series (b), the ends of the ascending tubes (9) dipping into the ion exchanger mass were in the top boundary surface of the resin layer (7) to be conveyed out of the container (1). The flow rate in the ascending tubes (9) was 2.5 m/second.

The change in direction in which the resin layer (7) was removed from the region of the central drainage (8) was conveyed out of the container (1) resulted in no change at all in the properties of the mixed bed during the loading stage. Rather, the same residual values, conductivity values and total throughputs as given in Table 1 in Example 1 were achieved for the individual layer thickness D.

What is claimed is:

1. In the internal regeneration of mixed bed filters wherein the exhausted ion exchanger mass of the mixed bed is separated into cation exchanger and anion exchanger by means of upward flowing liquid, the cation exchanger and anion exchanger are separately regenerated and washed out and then both components are mixed again to form the mixed bed for the next loading stage the improvement comprising the following steps:
    (a) loading the mixed bed filter,
    (b) adding to the loaded mixed exchangers the interface layer removed in step (f) hereinbelow,
    (c) passing liquid upwardly to separate the mixed exchangers into anion exchanger and cation exchanger,
    (d) separately regenerating the anion exchanger and the cation exchanger in the same vessel employed for filtration,
    (e) washing the regenerated anion and cation exchangers,
    (f) removing from the filter in the region of the cation exchanger/anion exchanger interface a layer of material without substantial disruption of the bodies of ion exchanger adjacent said layer, and
    (g) mixing the anion and cation exchangers remaining in the vessel to provide the mixed bed for the next loading stage.

2. The process according to claim 1, wherein the thickness of the layer removed in step (f) is 50 to 250 mm above and below the theoretical interface.

3. The process according to claim 1, wherein the thickness of the layer removed in step (f) is 100 to 200 mm above and below the theoretical interface.

4. The process according to claim 1, wherein the layer in step (f) is removed hydraulically.

5. A mixed bed filter with internal regeneration comprising
    (a) a container,
    (b) closable feed lines at the top and bottom of the container,
    (c) a liquid-permeable plate near the bottom of the container,
    (d) a bed of mixed cation and anion exchangers on the plate,
    (e) a central drainage at the level of the theoretical cation exchanger/anion exchanger interface,
    (f) a storage vessel, and
    (g) at least one vertical ascending tube dipping into the ion exchanger mass and communicating at its remote end with the storage vessel,
    (h) the distance between the center of any ascending tube and the container wall being at most 400 mm and, where there is more than one ascending tube, the distance between their centers being at most 800 mm, the distance between the center of any ascending tube and the container wall being at most 8 times the vertical distance between the central drainage and the bottom of the ascending tube.

6. The mixed bed filter according to claim 5, wherein the distance between the center of any ascending tube and the container wall is from 150 to 300 mm and, where there is more than one ascending tube, the distance between their centers is from 300 to 600 mm.

7. The mixed bed filter according to claim 6 wherein the internal diameter of each ascending tube is from 10 to 50 mm.

8. The mixed bed filter according to claim 6 wherein each ascending tube dips vertically into the ion exchanger mass from the top.

* * * * *